United States Patent
Liang (10) Patent No.: US 11,917,106 B2
(45) Date of Patent: Feb. 27, 2024

(54) HARDPHONE, METHOD FOR IMPLEMENTING TRAFFIC OPERATION, CALL CENTER SYSTEM, AND STORAGE MEDIUM

(71) Applicant: ZTE Corporation, Shenzhen (CN)

(72) Inventor: Huasheng Liang, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 0 days.

(21) Appl. No.: 17/773,991

(22) PCT Filed: Oct. 9, 2020

(86) PCT No.: PCT/CN2020/120052
§ 371 (c)(1),
(2) Date: May 3, 2022

(87) PCT Pub. No.: WO2021/093490
PCT Pub. Date: May 20, 2021

(65) Prior Publication Data
US 2022/0377176 A1    Nov. 24, 2022

(30) Foreign Application Priority Data
Nov. 11, 2019  (CN) .......................... 201910995657.9

(51) Int. Cl.
*H04M 3/00* (2006.01)
*H04M 3/523* (2006.01)
(Continued)

(52) U.S. Cl.
CPC .......... *H04M 3/5238* (2013.01); *G06F 3/165* (2013.01); *G06F 3/167* (2013.01); *H04M 3/5175* (2013.01); *H04M 2203/402* (2013.01)

(58) Field of Classification Search
CPC ............. H04M 3/5175; H04M 3/5183; H04M 3/5238; H04M 3/5166; G06F 3/165; H06F 3/167
See application file for complete search history.

(56) References Cited

U.S. PATENT DOCUMENTS

| 10,298,752 | B1 | 5/2019 | Surazski et al. |
| 2013/0208880 | A1 | 8/2013 | Lovy et al. |

FOREIGN PATENT DOCUMENTS

| CN | 2746672 | 12/2005 |
| CN | 101106485 A | 1/2008 |

(Continued)

OTHER PUBLICATIONS

European Patent Office. Extended European Search Report for EP Application No. 20887055.0, dated Nov. 18, 2022, pp. 1-7.
(Continued)

*Primary Examiner* — Rasha S Al Aubaidi
(74) *Attorney, Agent, or Firm* — Vivacqua Crane, PLLC (57) ABSTRACT

A hard phone, a method for implementing a traffic operation, a call center system, and a non-transitory computer-readable storage medium. The hard phone may include: a processing module (11), an input module (12), a sending module (13), a display device (14), and a receiving module (15). The display device (14) displays different types of traffic operation instructions such that a user carries out selection. The input module (12) receives the traffic operation instruction inputted by the user and an identity identification of a target attendant, and transmit to the processing module (11). The processing module (11) processes the traffic operation instruction and the identity identification according to a preset protocol, and then transmit same to the sending module (13), and send to a server via the sending module
(Continued)

(13). The receiving module (15) receives and transmit the execution result to the processing module (11).

13 Claims, 3 Drawing Sheets

(51) Int. Cl.
 *G06F 3/16* (2006.01)
 *H04M 3/51* (2006.01)

(56) References Cited

FOREIGN PATENT DOCUMENTS

| CN | 101227632 A | 7/2008 |
| CN | 101610321 A | 12/2009 |
| CN | 101616220 A | 12/2009 |
| CN | 102104691 A | 6/2011 |
| CN | 108337387 A | 7/2018 |
| RU | 2501178 C2 | 12/2013 |
| RU | 2704738 C1 | 10/2019 |

OTHER PUBLICATIONS

The State Intellectual Property Office of People's Republic of China. First Office Action for CN Application No. 2019109956579 and English translation, dated Dec. 1, 2022, pp. 1-16.
The State Intellectual Property Office of People's Republic of China. First Search Report for CN Application No. 2019109956579 and English translation, dated Nov. 16, 2022, pp. 1-4.
International Searching Authority. International Search Report and Written Opinion for PCT Application No. PCT/CN2020/120052 and English translation, dated Dec. 30, 2020, pp. 1-10.
Rospatent Federal Service for Intellectual Property. Office Action for RU Application No. 2022114186/07(029668) and English translation, dated Mar. 2, 2023, pp. 1-14.
Rospatent Federal Service for Intellectual Property. Search Report for RU Application No. 2022114186/07(029668) and English translation, dated Mar. 2, 2023, pp. 1-4.

HARDPHONE, METHOD FOR IMPLEMENTING TRAFFIC OPERATION, CALL CENTER SYSTEM, AND STORAGE MEDIUM

CROSS-REFERENCE TO RELATED APPLICATION

This application is a national stage filing under 35 U. S.C. § 371 of international application number PCT/CN2020/120052, filed on Oct. 9, 2020, which claims priority to Chinese patent application No. 201910995657.9 filed on Nov. 11, 2019. The contents of these applications are incorporated herein by reference in their entirety.

TECHNICAL FIELD

The embodiments of the present disclosure relate to the technical field of communications, and in particular to a hard phone, a method for implementing a telephone traffic operation, a call center system, and a non-transitory computer-readable storage medium.

BACKGROUND

A customer service center, as a call response hub mainly dealing with incoming calls, is able to provide telephone response services for customers, and attendants can perform call-related service processing by means of two scenarios: soft phones or hard phones.

In some cases, for the hard phone scenario, due to the dependence on PC clients or cloud desktops, usually only simple attendant functions such as login, logout, hold, resume, idle, busy, out-calling, transfer, conference, consultation, etc., corresponding to simple keys can be implemented, while for complex attendant functions such as listening, chime-in, forced release, forced lock, forced busy, forced idle, forced logout, etc., their implementation often requires customization of numerous function keys. However, arranging too many function keys on the hard phone will reduce the ease of use of the hard phone, which affects the manager of the call response center to manage the attendant staff.

SUMMARY

The present disclosure provides a hard phone, a method for implementing a telephone traffic operation, a call center system, and a non-transitory computer-readable storage medium, thereby enabling complex attendant functions and facilitating the management of attendant staff by the manager of the call center.

In accordance with an aspect of the present disclosure, an embodiment provides a hard phone, which may include: a processing module, an input module, a sending module, a display device, and a receiving module, the input module, the sending module, the display device, and the receiving module being connected to the processing module, respectively, where the display device is configured to display telephone traffic operation commands of different types; the input module is configured to receive a telephone traffic operation command and an identity of a target attendant input by a user, and to transmit the telephone traffic operation commands and the identity of the target attendant to the processing module, where the telephone traffic operation command is configured to manage the target attendant; the processing module is configured to process the telephone traffic operation command and the identity of the target attendant in accordance with a preset protocol and then transmit the processed telephone traffic operation command and the processed identity of the target attendant to the sending module, and to send the processed telephone traffic operation command and the processed identity of the target attendant to a server through the sending module; and the receiving module is configured to receive an execution result of the execution of the processed telephone traffic operation command by the server on the target attendant and to transmit the execution result to the processing module.

In accordance with an aspect of the present disclosure, another embodiment provides a method for implementing a telephone traffic operation, which is applied to a hard phone as described above, which may include: receiving a telephone traffic operation command and an identity of a target attendant input by a user; sending the telephone traffic operation command and the identity of the target attendant to a server; and receiving an execution result of the execution of the telephone traffic operation command by the server on the target attendant.

In accordance with an aspect of the present disclosure, yet another embodiment provides a call center system, which may include a server and a hard phone as described above, where the hard phone is configured to process a telephone traffic operation command and an identity of a target attendant input by a user in accordance with a preset protocol, and then transmit the processed telephone traffic operation command and the processed identity of the target attendant to the server; and the server is configured to execute the processed telephone traffic operation command on the target attendant and send an execution result for the target attendant to the hard phone.

In accordance with a fourth aspect of the present disclosure, yet another embodiment provides a non-transitory computer-readable storage medium storing a computer program which is configured to, when executed, implement the method of the second aspect.

The above embodiments and other aspects and the implementations thereof in the present disclosure are further described in the brief description of drawings, detailed description, and appended claims.

DETAILED DESCRIPTION

In order to make the purposes, technical schemes and advantages of the present disclosure clear, the embodiments of the present disclosure will be described hereinafter in detail with reference to the accompanying drawings. It should be noted that any combinations of embodiments and features of the embodiments of the present disclosure without conflict are possible.

Example Embodiment I

Figure 1:
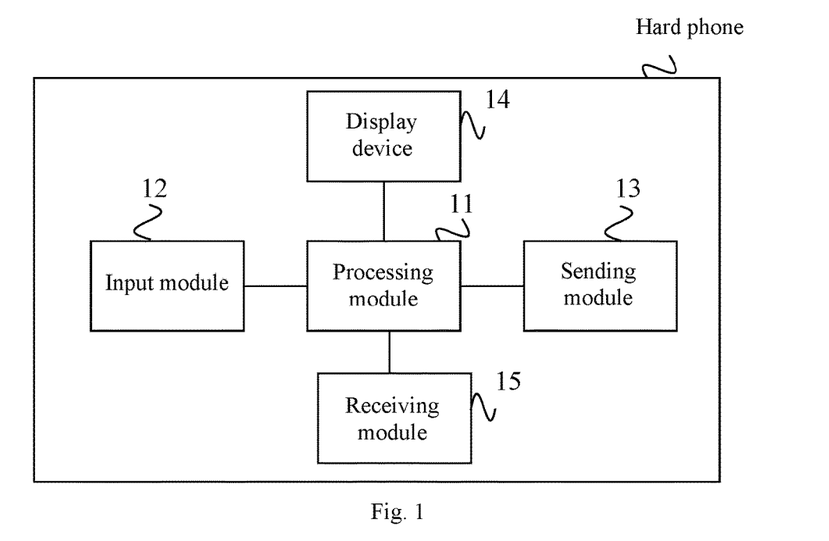
FIG. 1 is a structural schematic diagram of a hard phone provided in example embodiment I of the present disclosure.

In an example implementation, the present disclosure provides a hard phone, as shown in FIG. 1, which illustrates a structural schematic diagram of the hard phone in this implementation of the present disclosure. The hard phone may be suitable for the implementation of complex attendant functions.

As shown in FIG. 1, the hard phone provided in the implementation of the present disclosure includes: a processing module 11, an input module 12, a sending module 13, a display device 14, and a receiving module 15, the input module 12, the sending module 13, the display device 14, and the receiving module 15 being connected to the processing module 11, respectively.

The display device 14 is configured to display telephone traffic operation commands of different types; the input module 12 is configured to receive a telephone traffic operation command and an identity of a target attendant input by a user, and to transmit the telephone traffic operation commands and the identity of the target attendant to the processing module, where the telephone traffic operation command is configured to manage the target attendant; the processing module 11 is configured to process the telephone traffic operation command and the identity of the target attendant in accordance with a preset protocol and then transmit the processed telephone traffic operation command and the processed identity of the target attendant to the sending module 13, and to send the processed telephone traffic operation command and the processed identity of the target attendant to a server through the sending module 13; and the receiving module 15 is configured to receive an execution result of the execution of the processed telephone traffic operation command by the server on the target attendant and to transmit the execution result to the processing module.

The processing module in the implementation of the present disclosure may specifically include a processor and a memory, and the processor and memory may be connected via a bus and integrated into a single chip, thereby reducing the space occupied in the hard phone. The memory in this implementation, as a non-volatile computer-readable storage medium, can be used to store non-volatile software programs as well as non-volatile computer-executable programs, while the processor, by running the non-volatile software programs and instructions stored in the memory, can thus process the identity of the target attendant and the attendant identity of the user, and generate a status query instruction for the target attendant at regular intervals. In addition, the processor in the present disclosure has more complex configuration parameters and can be used for timely allocation and scheduling of the acquired information in order to accurately allocate the acquired information to the modules corresponding to the hard phone, thus realizing real-time monitoring of the target attendant by the user.

The display device of the implementation of the present disclosure includes display chips that support displaying different types of information, and the display chips can be used to support displaying the telephone traffic operation command, the identity of the target attendant or the attendant identity of the user, so that different display chips are used to support the display device to display different types of information, thus making the display device more powerful than a display screen that can only be used to display telephone numbers in the existing technology.

In addition, the sending module in this implementation may be specifically composed of a wireless radio frequency chip to achieve long-distance information transmission with the server, and the receiving module is correspondingly composed of a wireless receiving chip to achieve wireless receiving of the information transmitted by the server, thereby implementing the effective reception by the server of the execution result of the execution by the target attendant of the processed telephone traffic operation.

In an implementation, the telephone traffic operation command includes: listening, chime-in, forced release, forced lock, forced busy, forced idle, or forced logout. In the present disclosure, the user may specifically be a manager of a call center, and the target attendant may specifically be a staff member performing call services in the call center. The user manages the call services of the staff member by inputting commands through a telephone terminal, for example, if the user, while listening to the target attendant, finds that the target attendant is impolite in his or her attitude toward the customer in the call service, the user may input a chime-in command through the hard phone and transmit it to the target attendant through the server in order to provide a chime-in reminder for the call service of the target attendant. Of course, this implementation is only illustrated with the telephone traffic operation command for managing the target attendant as an example, and the hard phone in the present disclosure can also implement simple regular attendant functions for adjusting the user's own telephone traffic status, for example, functions such as login, logout, hold, resume, idle, busy, out-calling, transfer, conference, consultation, etc. Since the operation commands for adjusting the user's own telephone traffic status are not the focus of the present disclosure, they will not be repeated in this implementation.

In an implementation, after the hard phone is powered up, the processing module in the hard phone is further configured to transmit saved telephone module identification to the server through the sending module, where the server registers the hard phone according to the telephone module identification.

In an implementation, the input module is further configured to receive an attendant identity of the user input by the user and transmit the attendant identity of the user to the processing module; and the processing module is configured to process the attendant identity of the user in accordance with the preset protocol to obtain a processed attendant identity of the user, transmit the processed attendant identity of the user to the sending module, and send the processed attendant identity of the user to the server through the sending module for the server to bind the processed identity of the target attendant and the processed attendant identity of the user.

The preset protocol of the present disclosure includes an encryption method or a standardization method. Of course, other protocols may also be used in the implementation of the present disclosure for processing, and as long as they can perform the conversion to information that can be recognized by the server, they also fall within the scope of protection of the present disclosure.

In addition, the identity in this implementation includes a job number or an extension number. Of course, the implementation of the present disclosure does not limit the specific type of the identity, and as long as it enables the determination of the identity of the user or attendant, it will fall within the scope of protection of the present disclosure. The present disclosure only uses the job number as the identity for example illustration.

Figure 2:
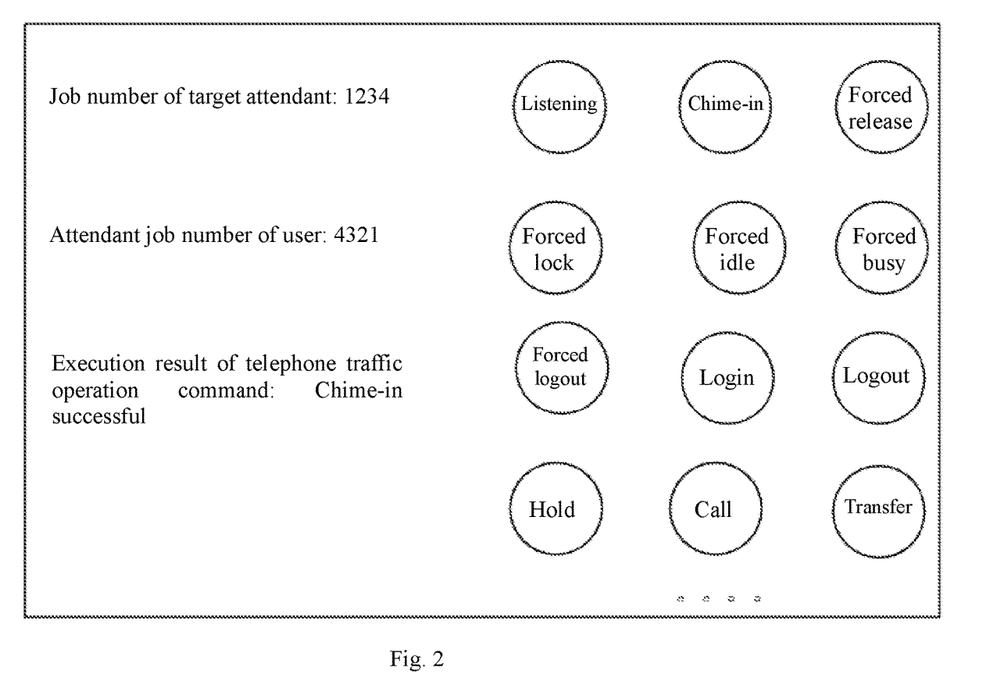
FIG. 2 is a schematic diagram of a display page of a display device in example embodiment I of the present disclosure.

In a specific implementation, the input module of the present disclosure may specifically consist of input keys representing (0, 1, 2, 3, 4, 5, 6, 7, 8, 9, *, #, Enter) and function keys representing directional movement (up, down, left, right), as shown in FIG. 2, which is a schematic diagram of a display page of the display device. Of course, FIG. 2 is only an example illustration and does not limit the telephone traffic operation commands listed in the drawing, and other types of telephone traffic operation commands are replaced by ellipses in the implementation of the present disclosure. Thus, the user may enter the job number of the target attendant or the attendant job number of the user via the input keys in the input module, and the user may select the type of the telephone traffic operation command on the display device via the function keys in the input module, and input it via the enter key. After acquiring the job number of the target attendant, the attendant job number of the user, and the telephone traffic operation command transmitted by the input module, the processing module performs encryption processing or standardization processing in accordance with a preset protocol in order to transform them into processed information that is compatible with the server, where the server will bind the processed job number of the target attendant and the processed attendant job number of the user to facilitate subsequent viewing of the executer and object of the call service management task. At the same time, the receiving module is configured to receive an execution result of the execution of the telephone traffic operation command by the server on the target attendant and to transmit the execution result to the processing module. FIG. 2 shows the example illustration of an execution result obtained in the case where the job number of the target attendant is "1234", the attendant job number of the user is "4321", and the telephone traffic operation command selected by the user is "chime-in".

In an implementation, the display device is further configured to display the execution result acquired from the processing module, so that the user can easily view the execution results of the operation commands.

In an implementation, the processing module is further configured to generate a status query instruction for the target attendant at regular intervals and send the status query instruction to the server through the sending module for the server to acquire status information of the target attendant according to the status query instruction and transmit the status information of the target attendant to the receiving module; and the processing module is further configured to acquire the status information of the target attendant sent by the receiving module.

In this implementation, the timing interval may be set to 2 seconds, i.e., every two seconds, a status query instruction for the target attendant is sent cyclically and regularly so that the status of the target attendant can be monitored in real time. Of course, this implementation does not limit the specific value of the timing interval.

An embodiment of the present disclosure provides a hard phone which, through the information interaction between a processing module, an input module, a sending module, a display device, and a receiving module, enables a user to send a telephone traffic operation command and acquire an execution result of the execution of the telephone traffic operation command on the target attendant, thereby facilitating the management by the user of the call service of the target attendant.

Example Embodiment II

Figure 3:
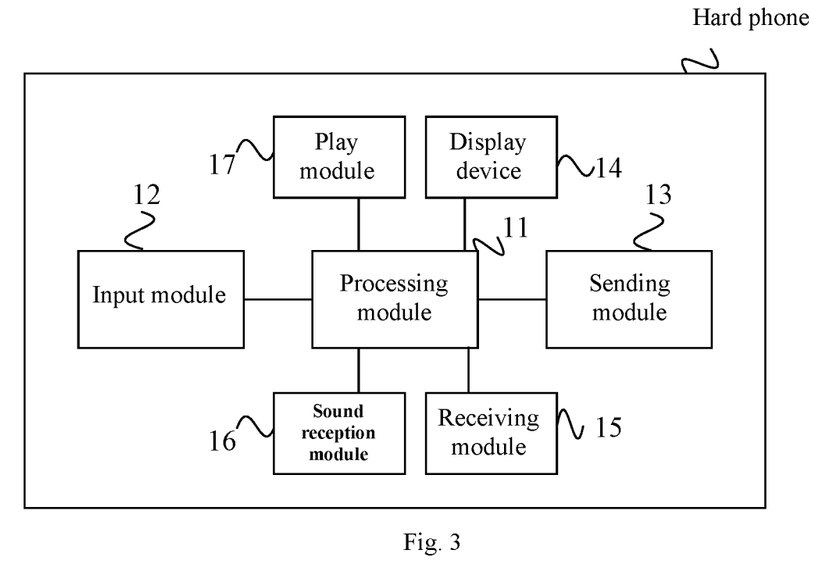
FIG. 3 is a structural schematic diagram of a hard phone provided in example embodiment II of the present disclosure.

In an example implementation, the present disclosure provides a hard phone. FIG. 3 shows a structural schematic diagram of the hard phone in the implementation of the present disclosure. The implementation of the present disclosure adds a sound reception module 16 and a play module 17 to the first implementation, and the sound reception module 16 and the play module 17 are connected to the processing module 11, respectively.

In an implementation, the sound reception module 16 is configured to acquire first voice information of the user and transmit the first voice information to the processing module for processing, and transmit the processed first voice information to the server through the sending module and transmit it to the target attendant through the server; and the play module 17 is configured to receive second voice information fed back through the receiving module by the target attendant.

It should be noted that the processing module may specifically process the first voice information through encoding, and transmit the encoded first voice information to the server and transmit it through the server to the target attendant. In addition, the second voice information acquired by the receiving module is information that can be recognized by the user after being decoded by the processing module.

The sound reception module in this implementation may specifically be a microphone, and the play module may specifically be a headset.

In an implementation, the hard phone further includes a volume control module configured to control a play volume level in the second voice information, thus facilitating the adjustment by the user of the volume to a suitable range according to the actual situation; and the volume control module is configured to connect with the play module. The volume control module is not marked in FIG. 3.

It should be noted that the hard phone in this implementation also includes common input keys functions such as hands-free, mute and replay. Since the above input keys functions are not the focus of the present disclosure, they will not be repeated in this implementation.

Example Embodiment III

Figure 4:
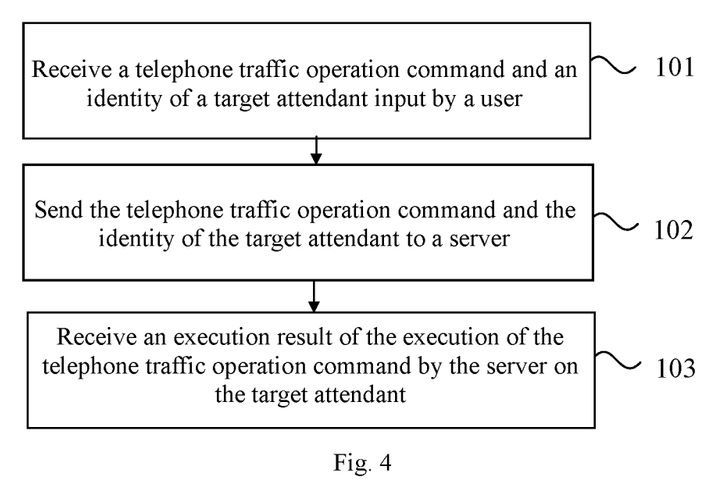
FIG. 4 is a flowchart of a method for implementing a telephone traffic operation provided in example embodiment III of the present disclosure.

In an example implementation, the present disclosure provides a method for implementing a telephone traffic operation, as shown in FIG. 4, which is a flowchart of the method for implementing a telephone traffic operation provided in the present disclosure. This method can be applied to the scenario of performing a telephone traffic operation through a hard phone. The method may be performed by the hard phone provided in the present disclosure.

As shown in FIG. 4, a method for implementing a telephone traffic operation provided in the implementation of the present disclosure includes steps 101 to 103.

At step 101, a telephone traffic operation command and an identity of a target attendant input by a user are received.

In an implementation, before receiving a telephone traffic operation command and an identity of a target attendant input by a user, the method further includes: transmitting saved telephone module identification to the server, where the server registers the hard phone according to the telephone module identification.

It should be noted that in the implementation of the present disclosure, the saved telephone module identification is transmitted to the server and registered mainly to enable intranet communication. Of course, it is also possible to register within the telephone network of the operator so that extranet communication, i.e., communication between users and customers, can be realized.

In an implementation, before receiving a telephone traffic operation command and an identity of a target attendant input by a user, the method further includes: receiving an attendant identity of the user input by the user; and sending the attendant identity of the user to the server.

It should be noted that in the implementation of the present disclosure, the user mainly refers to the person who manages the target attendant in the call center.

In this implementation, the user may input the job number of the user by using the input keys on the hard phone that represent (0, 1, 2, 3, 4, 5, 6, 7, 8, 9, *, #, Enter). Since the display device of the hard phone can display different types of telephone traffic operation commands, including those for managing the target attendant, such as listening, chime-in, forced release, forced lock, forced busy, forced idle, or forced logout, etc., and of course also including regular telephone traffic operation commands for adjusting the user's own telephone traffic status, for example, functions such as login, logout, hold, resume, idle, busy, out-calling, transfer, conference, consultation, etc., the user may use the function keys on the hard phone representing the directional movement (up, down, left, right) to select the above mentioned telephone traffic operation commands.

It should be noted that after the user inputs the job number of the user, if the user needs to adjust his or her own telephone traffic status, he or she may continue to input the regular telephone traffic operation commands for adjusting the user's own telephone traffic status. For example, in the case of a login command, the login command is transmitted to the server, and the execution result of the execution of the telephone traffic operation command on the user attendant returned by the server according to the login command is received, and the above execution result may be displayed, for example, displaying login successful. In addition, the hard phone also sends an attendant status query instruction for the user to the server at regular intervals, so that the attendant status of the user can be monitored.

In an implementation, after receiving a telephone traffic operation command and an identity of a target attendant input by a user, the method further includes: processing the telephone traffic operation command and the identity of the target attendant in accordance with a preset protocol and obtaining the processed telephone traffic operation command and the processed identity of the target attendant; and sending the telephone traffic operation command and the identity of the target attendant to a server includes: sending the processed telephone traffic operation command and the processed identity of the target attendant to the server.

At step 102, the telephone traffic operation command and the identity of the target attendant are sent to a server.

It should be noted that if a telephone traffic operation instruction for managing the target attendant is input, the hard phone sends the user identity input by the user to the server, where the present disclosure is illustrated by the example in which the identity is a job number; and the server binds the job number of the target attendant and the job number of the user to facilitate subsequent viewing of the executer and the object of the call service management task. In addition, the server returns the execution result of the execution of the telephone traffic operation command on the target attendant.

At step 103, an execution result of the execution of the telephone traffic operation command by the server on the target attendant is received.

In an implementation, after receiving an execution result of the execution of the telephone traffic operation command by the server on the target attendant, the method further includes: displaying the execution result.

For example, if the telephone traffic operation command sent by the hard phone for the target attendant is listening, the server sends the execution result of the execution of listening on the target attendant to the hard phone after executing the operation command of listening, and displays the execution result, such as "listening successful". In addition, if the execution result of the execution of listening is a listening failure, the user may also re-input the listening command through the hard phone, or check the network status, so that the user can be informed of the specific implementation of the telephone traffic operation commands in real time, and can adopt appropriate adjustment strategies for the implementation.

In an implementation, after receiving an execution result of the execution of the telephone traffic operation command by the server on the target attendant, the method further includes: generating a status query instruction for the target attendant at regular intervals; sending the status query instruction to the server for the server to acquire status information of the target attendant according to the status query instruction; and receiving the status information of the target attendant fed back by the server.

The hard phone also sends a status query instruction for the target attendant to the server at regular intervals, and monitors the status of the target attendant based on the status information of the target attendant returned by the server.

An embodiment of the present disclosure provides a method for implementing a telephone traffic operation which, by receiving a telephone traffic operation command and an identity of a target attendant input by a user, sending the telephone traffic operation command and the identity of the target attendant to a server, and receiving an execution result of the execution of the telephone traffic operation command by the server on the target attendant, enables the user to send the telephone traffic operation command and acquire the execution result of the execution of the telephone traffic operation command on the target attendant, thereby facilitating the management by the user of the call service of the target attendant.

Example Embodiment IV

Figure 5:
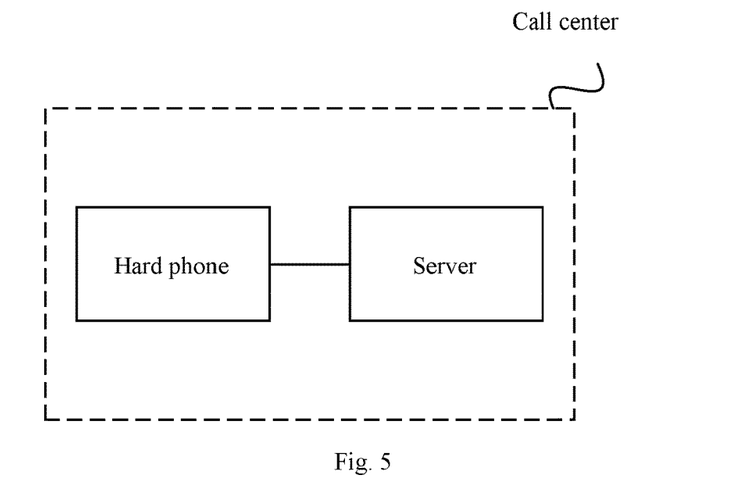
FIG. 5 is a structural schematic diagram of a call center system provided in example embodiment IV of the present disclosure.

The present disclosure provides a call center system, as shown in FIG. 5, which is a structural schematic diagram of the call center system provided in the present disclosure. As shown in FIG. 5, the system includes: a server and a hard phone of example embodiment I or example embodiment II.

The hard phone is configured to process a telephone traffic operation command and an identity of a target attendant input by a user in accordance with a preset protocol, and then transmit the processed telephone traffic operation command and the processed identity of the target attendant to the server; and the server is configured to execute the processed telephone traffic operation command on the target attendant and send an execution result for the target attendant to the hard phone.

Figure 6:
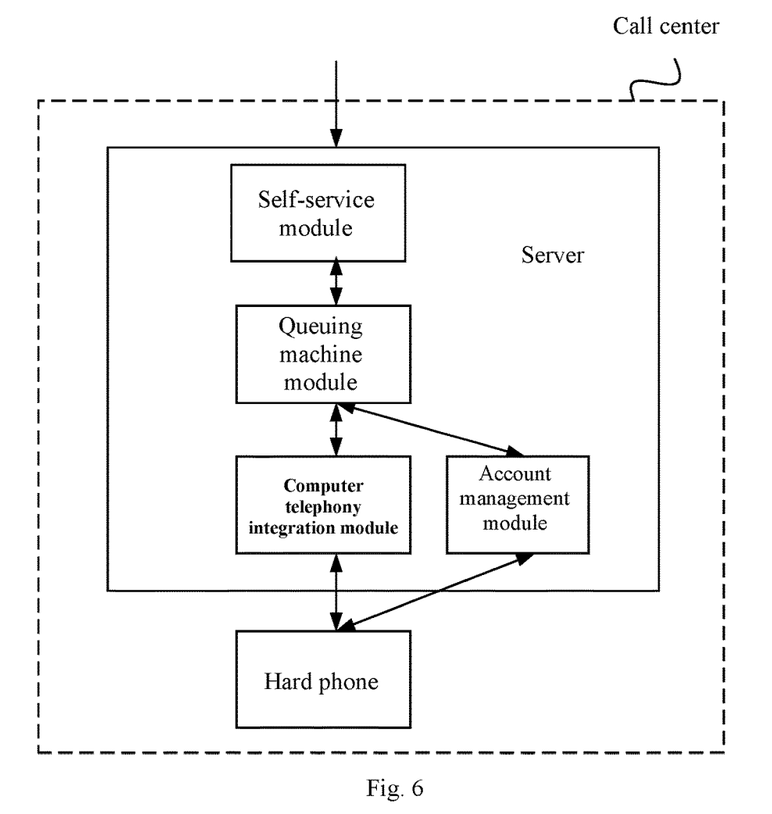
FIG. 6 is a specific structural diagram of a server provided in example embodiment IV of the present disclosure.

FIG. 6 is a specific illustration of the structure of the server in this embodiment. The server in the implementation of the present disclosure mainly includes a self-service module, a queuing machine module, a computer telephony integration module and an account management module. Since the structure of the server and the specific working principle are not the focus of the present disclosure, they will not be repeated in this implementation.

Example Embodiment V

The present disclosure provides a non-transitory computer-readable storage medium storing a computer program which is configured to, when executed, implement the method of example embodiment III.

Several embodiments of the present disclosure and the technical principles that employed by the embodiments are described. It will be understood by those skilled in the art that the present disclosure is not limited to the particular embodiments described herein, and various obvious variations, readjustments and substitutions can be made by those skilled in the art without departing from the scope of protection of the present disclosure. Thus, while the present disclosure is described in some detail by the above embodiments, the present disclosure is not limited to the above embodiments, but may include more other equivalent embodiments without departing from the concept of the present disclosure, and the scope of the present disclosure is determined by the scope of the appended claims.

The invention claimed is:

1. A hard phone, comprising:
a processing module, an input module, a sending module, a sound reception module, a play module, a volume control module, a display device, and a receiving module, each of the input module, the sending module, the sound reception module, the play module, the display device, and the receiving module being connected to the processing module, and the volume control module being connected to the play module, wherein:
the display device is configured to display telephone traffic operation commands of different types;
the input module is configured to receive a telephone traffic operation command and an identity of a target attendant input by a user, and transmit the telephone traffic operation command and the identity of the target attendant to the processing module, wherein the telephone traffic operation command is used to manage the target attendant;
the processing module is configured to process the telephone traffic operation command and the identity of the target attendant in accordance with a preset protocol and then transmit the processed telephone traffic operation command and the processed identity of the target attendant to the sending module, and to send the processed telephone traffic operation command and the processed identity of the target attendant to a server through the sending module;
the receiving module is configured to receive an execution result of execution of the processed telephone traffic operation command by the server on the target attendant, and to transmit the execution result to the processing module;
the sound reception module is configured to acquire first voice information of the user and transmit the first voice information to the processing module for processing, and transmit the processed first voice information to the target attendant through the sending module;
the play module is configured to receive second voice information fed back through the receiving module by the target attendant; and
the volume control module is configured to control a play volume level in the second voice information.

2. The hard phone of claim 1, wherein the display device is further configured to display the execution result acquired from the processing module.

3. The hard phone of claim 1, wherein:
the processing module is further configured to generate a status query instruction for the target attendant at regular intervals and send the status query instruction to the server through the sending module for the server to acquire status information of the target attendant according to the status query instruction and transmit the status information of the target attendant to the receiving module; and
the processing module is further configured to acquire the status information of the target attendant sent by the receiving module.

4. The hard phone of claim 1, wherein:
the input module is further configured to receive an attendant identity of the user input by the user and transmit the attendant identity of the user to the processing module; and
the processing module is configured to process the attendant identity of the user in accordance with the preset protocol to obtain a processed attendant identity of the user, transmit the processed attendant identity of the user to the sending module, and send the processed attendant identity of the user to the server through the sending module for the server to bind the processed identity of the target attendant and the processed attendant identity of the user.

5. The hard phone of claim 1, wherein the processing module is further configured to transmit saved telephone module identification to the server through the sending module, wherein the server registers the hard phone according to the telephone module identification.

6. A method for implementing a telephone traffic operation applicable to a hard phone of claim 1, comprising:
receiving a telephone traffic operation command and an identity of a target attendant input by a user;
sending the telephone traffic operation command, the processed first voice information of the user, and the identity of the target attendant to a server; and
receiving an execution result of execution of the telephone traffic operation command by the server on the target attendant, and the second voice information fed back by the target attendant.

7. The method of claim 6, after receiving a telephone traffic operation command and an identity of a target attendant input by a user, further comprising:
processing the telephone traffic operation command and the identity of the target attendant in accordance with a preset protocol and obtaining the processed telephone traffic operation command and the processed identity of the target attendant;
wherein sending the telephone traffic operation command and the identity of the target attendant to a server comprises:
sending the processed telephone traffic operation command and the processed identity of the target attendant to the server.

8. The method of claim 7, after receiving an execution result of execution of the telephone traffic operation command by the server on the target attendant, further comprising:
displaying the execution result.

9. The method of claim 6, before receiving a telephone traffic operation command and an identity of a target attendant input by a user, further comprising:
transmitting saved telephone module identification to the server, wherein the server registers the hard phone according to the telephone module identification.

10. The method of claim 6, after receiving an execution result of execution of the telephone traffic operation command by the server on the target attendant, further comprising:
generating a status query instruction for the target attendant at regular intervals;
sending the status query instruction to the server for the server to acquire status information of the target attendant according to the status query instruction; and
receiving the status information of the target attendant fed back by the server.

11. The method of claim 6, before receiving a telephone traffic operation command and an identity of a target attendant input by a user, further comprising:
receiving an attendant identity of the user input by the user; and
sending the attendant identity of the user to the server.

12. A non-transitory computer-readable storage medium storing a computer program, wherein the computer program is configured to, when executed, implement the method of claim 6.

13. A call center system, comprising:
a hard phone, comprising:
a processing module, an input module, a sending module, a sound reception module, a play module, a volume control module, a display device, and a receiving module, each of the input module, the sending module, the sound reception module, the play module, the display device, and the receiving module being connected to the processing module, and the volume control module being connected to the play module, wherein:
the display device is configured to display telephone traffic operation commands of different types;
the input module is configured to receive a telephone traffic operation command and an identity of a target attendant input by a user, and transmit the telephone traffic operation command and the identity of the target attendant to the processing module, wherein the telephone traffic operation command is used to manage the target attendant;
the processing module is configured to process the telephone traffic operation command and the identity of the target attendant in accordance with a preset protocol and then transmit the processed telephone traffic operation command and the processed identity of the target attendant to the sending module, and to send the processed telephone traffic operation command and the processed identity of the target attendant to a server through the sending module;
the receiving module is configured to receive an execution result of execution of the processed telephone traffic operation command by the server on the target attendant, and to transmit the execution result to the processing module;
the sound reception module is configured to acquire first voice information of the user and transmit the first voice information to the processing module for processing, and transmit the processed first voice information to the target attendant through the sending module;
the play module is configured to receive second voice information fed back through the receiving module by the target attendant; and
the volume control module is configured to control a play volume level in the second voice information;
wherein the server is configured to execute the processed telephone traffic operation command on the target attendant and send an execution result for the target attendant to the hard phone; and
wherein the hard phone is configured to process the telephone traffic operation command and the identity of the target attendant input by the user in accordance with a preset protocol, and then transmit the processed telephone traffic operation command and the processed identity of the target attendant to the server.

* * * * *